(12) United States Patent
Khoshnevisan et al.

(10) Patent No.: US 11,937,185 B2
(45) Date of Patent: Mar. 19, 2024

(54) SHARED TRANSMIT POWER CONTROL FOR UPLINK SHARED AND CONTROL CHANNELS

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/446,041

(22) Filed: Aug. 26, 2021

(65) Prior Publication Data

US 2023/0068275 A1   Mar. 2, 2023

(51) Int. Cl.
*H04W 52/14* (2009.01)
(52) U.S. Cl.
CPC .................................. *H04W 52/14* (2013.01)
(58) Field of Classification Search
CPC ..... H04W 52/14; H04W 52/34; H04W 52/40; H04W 52/325; H04W 52/146;
(Continued)

(56) References Cited

U.S. PATENT DOCUMENTS

| 10,264,533 | B2 * | 4/2019 | Wang | H04W 72/0473 |
| 2012/0182945 | A1 * | 7/2012 | Blomgren | H04W 52/16 370/329 |

(Continued)

FOREIGN PATENT DOCUMENTS

| WO | WO-2011100673 A1 | 8/2011 |
| WO | WO-2013119166 A1 | 8/2013 |

OTHER PUBLICATIONS

3GPP TS 36.213: "3rd Generation Partnership Project, Technical Specification Group Radio Access Network, Evolved Universal Terrestrial Radio Access (E-UTRA), Physical Layer Procedures (Release 16)", 3GPP Standard, Technical Specification, 3GPP, Mobile Competence Centre, 650, Route Des Lucioles, F-06921 Sophia-Antipolis Cedex, France, vol. RAN WG1, No. V16.6.0, Jun. 30, 2021, pp. 496-556, XP052029979, 61 Pages, the whole document.

(Continued)

*Primary Examiner* — Lana N Le
(74) *Attorney, Agent, or Firm* — Norton Rose Fulbright US LLP

(57) ABSTRACT

This disclosure provides systems, methods, and devices for wireless communication that support a shared transmission power control (TPC) for uplink data and control channels. In a first aspect, a method includes a user equipment (UE) receiving a TPC command in downlink control messages from a serving base station. Each TPC command includes a power correction indicator. The UE may then apply an accumulation of power correction indicators received in the downlink control messages to an adjustment state associated with a transmit power of an of uplink control channel and an uplink data channel. The UE transmits to an uplink receive point, the uplink control or data channel according to the transmit power adjusted by the accumulation of power correction indicators applied to the adjustment state. Other aspects and features are also claimed and described.

20 Claims, 7 Drawing Sheets

(58) Field of Classification Search
CPC .. H04W 72/21; H04W 72/0473; H04W 72/04; H04W 52/346; H04W 52/16; H04W 52/36; H04W 72/1268; H04W 52/58; H04W 52/38; H04W 74/006; H04W 52/04; H04W 52/18; H04W 48/12; H04W 74/004; H04W 52/248; H04W 52/32; H04W 52/246; H04W 28/04; H04W 24/02; H04W 52/0209; H04W 72/20; H04W 88/04; H04B 7/0632; H04B 7/0426; H04B 7/155; H04B 7/15507; H04B 7/155528; H04B 7/15542; H04B 7/15592; H04B 7/2606

See application file for complete search history.

(56) References Cited

U.S. PATENT DOCUMENTS

| | | | | |
|---|---|---|---|---|
| 2013/0194947 | A1* | 8/2013 | Ehsan | H04W 24/10 370/252 |
| 2014/0321304 | A1* | 10/2014 | Yu | H04W 72/02 370/252 |
| 2015/0036556 | A1* | 2/2015 | Imamura | H04W 72/20 370/277 |
| 2015/0078270 | A1 | 3/2015 | Seo et al. | |
| 2016/0088620 | A1* | 3/2016 | Seo | H04W 52/04 370/329 |
| 2016/0219526 | A1* | 7/2016 | Englund | H04W 52/30 |
| 2019/0075524 | A1* | 3/2019 | Zhou | H04W 72/20 |
| 2019/0281622 | A1* | 9/2019 | Hwang | H04W 72/121 |
| 2020/0186234 | A1* | 6/2020 | Seo | H04W 88/04 |
| 2020/0287688 | A1* | 9/2020 | Takeda | H04L 5/0053 |
| 2021/0352643 | A1* | 11/2021 | Ahn | H04W 72/0446 |
| 2022/0174610 | A1* | 6/2022 | Qiao | H04W 52/146 |

OTHER PUBLICATIONS

3GPP TS 36.213: "3rd Generation Partnership Project, Technical Specification Group Radio Access Network, Evolved Universal Terrestrial Radio Access (E-UTRA), Physical Layer Procedures (Release 16)", 3GPP Standard, Technical Specification, 3GPP, Mobile Competence Centre, 650, Route Des Lucioles, F-06921 Sophia-Antipolis Cedex, France, vol. RAN WG1, No. V16.6.0, Jun. 30, 2021, XP052029975, pp. 8-60, 53 Pages, the whole document.
International Search Report and Written Opinion—PCT/US2022/074254—ISA/EPO—dated Nov. 9, 2022 (2106151WO).

* cited by examiner

SHARED TRANSMIT POWER CONTROL FOR UPLINK SHARED AND CONTROL CHANNELS

TECHNICAL FIELD

Aspects of the present disclosure relate generally to wireless communication systems, and more particularly, to uplink-dense deployment operations. Some features may enable and provide improved communications, including shared transmit power control (TPC) for both uplink shared and control channels.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving, by the UE, a transmit power control (TPC) command in one or more downlink control messages from a serving base station, wherein the TPC command includes a power correction indicator, applying, by the UE, an accumulation of one or more power correction indicators received in the one or more downlink control messages to an adjustment state associated with a transmit power of an of uplink control channel or an uplink data channel, and transmitting, by the UE to an uplink receive point, the uplink control channel or the uplink data channel according to the transmit power adjusted by the accumulation of the one or more power correction indicators applied to the adjustment state, wherein the uplink receive point is different from the serving base station.

In an additional aspect of the disclosure, an apparatus configured for wireless communication is disclosed. The apparatus includes at least one processor, and a memory coupled to the at least one processor. The at least one processor is configured to receive, by the UE, a TPC command in one or more downlink control messages from a serving base station, wherein the TPC command includes a power correction indicator, to apply, by the UE, an accumulation of one or more power correction indicators received in the one or more downlink control messages to an adjustment state associated with a transmit power of an of uplink control channel or an uplink data channel, and to transmit, by the UE to an uplink receive point, the uplink control channel or the uplink data channel according to the transmit power adjusted by the accumulation of the one or more power correction indicators applied to the adjustment state, wherein the uplink receive point is different from the serving base station.

In an additional aspect of the disclosure, an apparatus configured for wireless communication is disclosed. The apparatus includes means for receiving, by the UE, a TPC command in one or more downlink control messages from a serving base station, wherein the TPC command includes a power correction indicator, means for applying, by the UE, an accumulation of one or more power correction indicators received in the one or more downlink control messages to an adjustment state associated with a transmit power of an of uplink control channel or an uplink data channel, and means for transmitting, by the UE to an uplink receive point, the uplink control channel or the uplink data channel according to the transmit power adjusted by the accumulation of the one or more power correction indicators applied to the adjustment state, wherein the uplink receive point is different from the serving base station.

In an additional aspect of the disclosure, a non-transitory computer-readable medium stores instructions that, when executed by a processor, cause the processor to perform operations including receiving, by the UE, a TPC command in one or more downlink control messages from a serving base station, wherein the TPC command includes a power correction indicator, applying, by the UE, an accumulation of one or more power correction indicators received in the one or more downlink control messages to an adjustment state associated with a transmit power of an of uplink control channel or an uplink data channel, and transmitting, by the UE to an uplink receive point, the uplink control channel or the uplink data channel according to the transmit power adjusted by the accumulation of the one or more power correction indicators applied to the adjustment state, wherein the uplink receive point is different from the serving base station.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
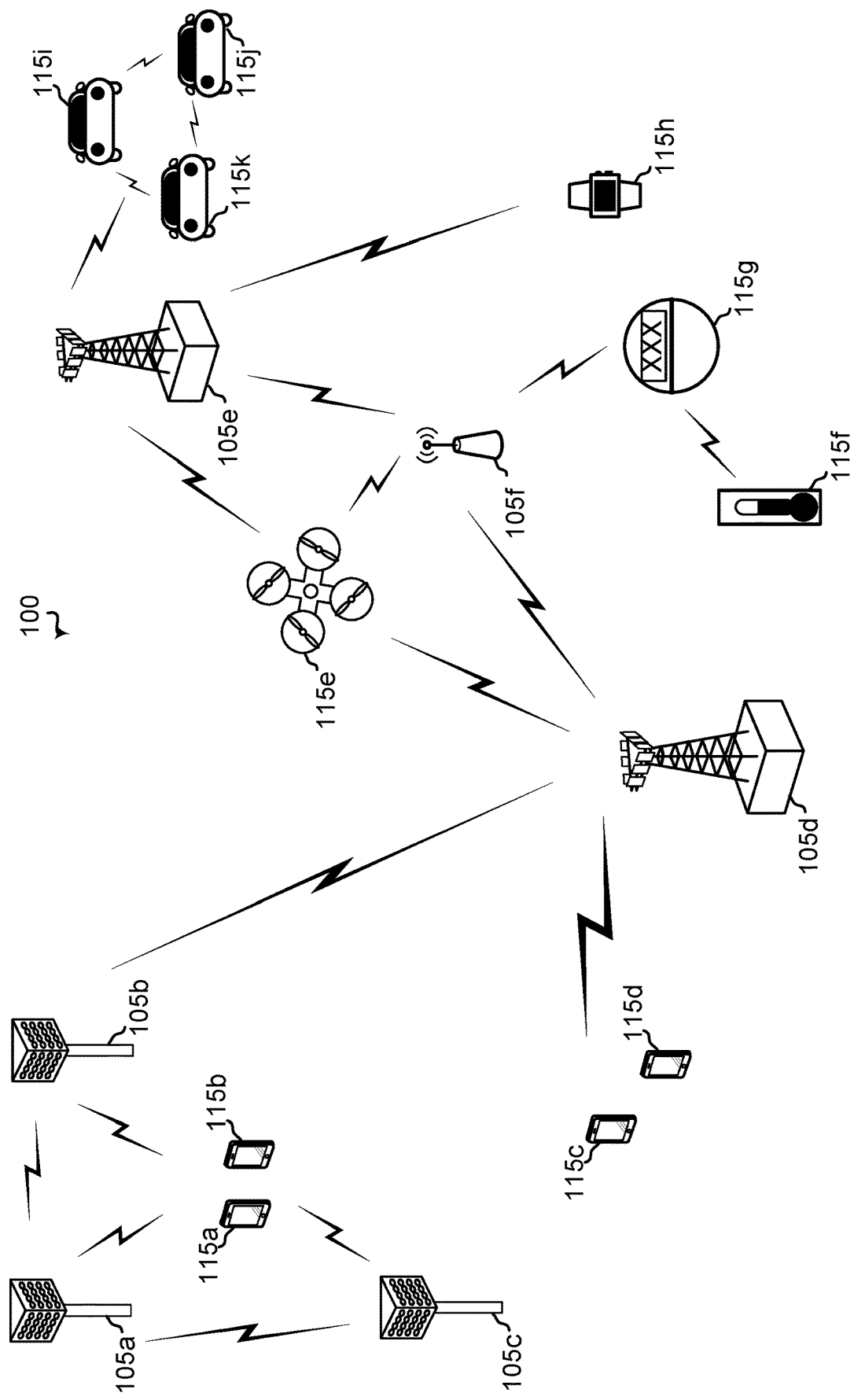
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support a shared TPC for uplink data and control channels according to one or more aspects of the present disclosure. Particular implementations of the subject matter described in this disclosure may be implemented to realize one or more of the following potential advantages or benefits. In some aspects, the present disclosure provides techniques applicable in an uplink dense deployment in which TPC may be shared between uplink data and control channels in order to reduce the overhead of power adjustments to adjust a transmit power determined based on the path loss in the downlink channel with a serving base station to a more suitable transmit power for a path loss in an uplink channel with a uplink receive point, which may be substantially different than the path loss in the downlink channel. Sharing of TPC may also allow for a UE to adjust its transmit power for uplink data and control channel transmissions more quickly.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.99999% reliability), ultra-low latency (e.g., ~ 1 millisecond (ms)), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
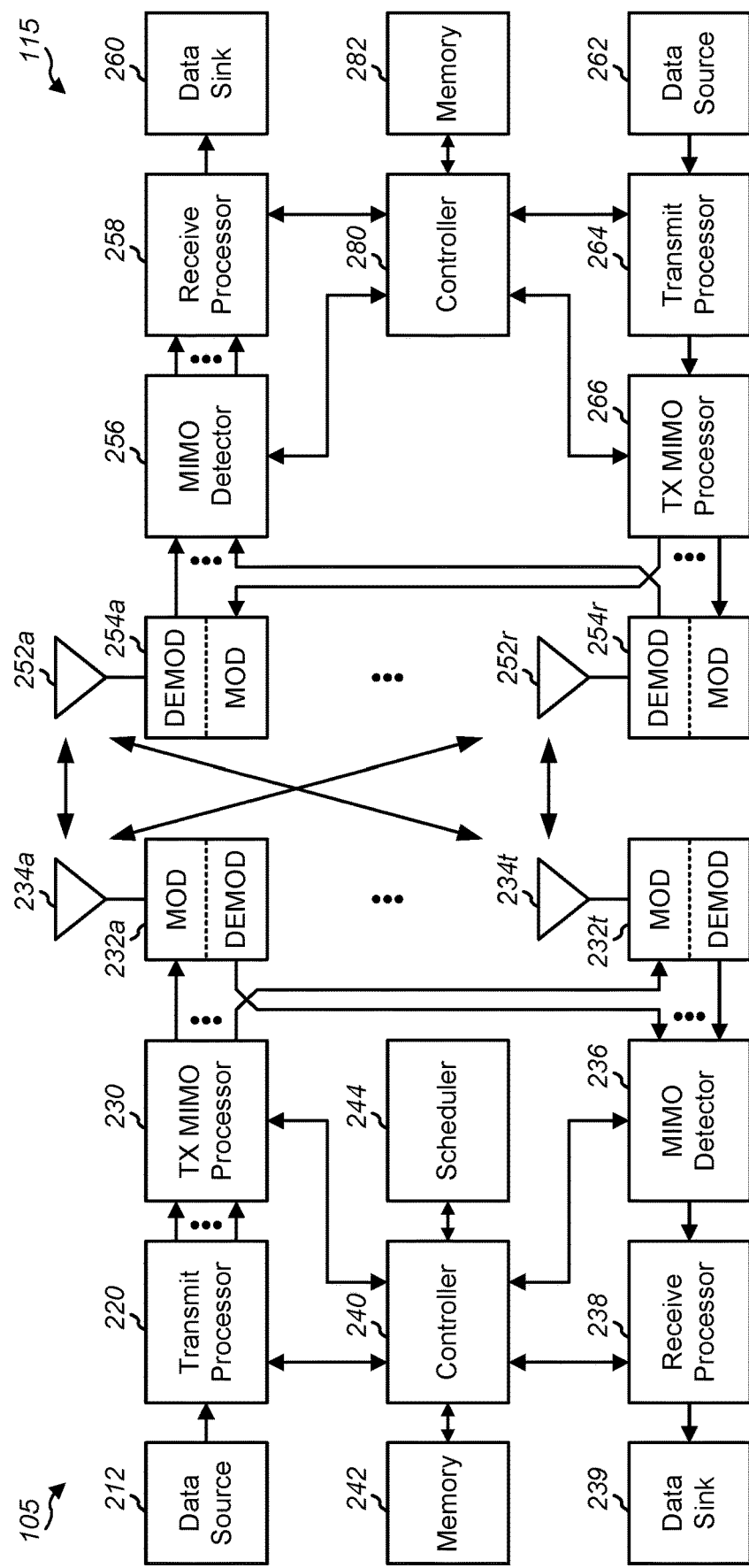
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 4, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-μs, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-μs slots, may also be referred to as a "Type 1 LBT." An abbreviated LBT procedure, such as a CAT 2 LBT procedure, which may include a one-shot CCA for 16-μs or 25-μs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Figure 3:
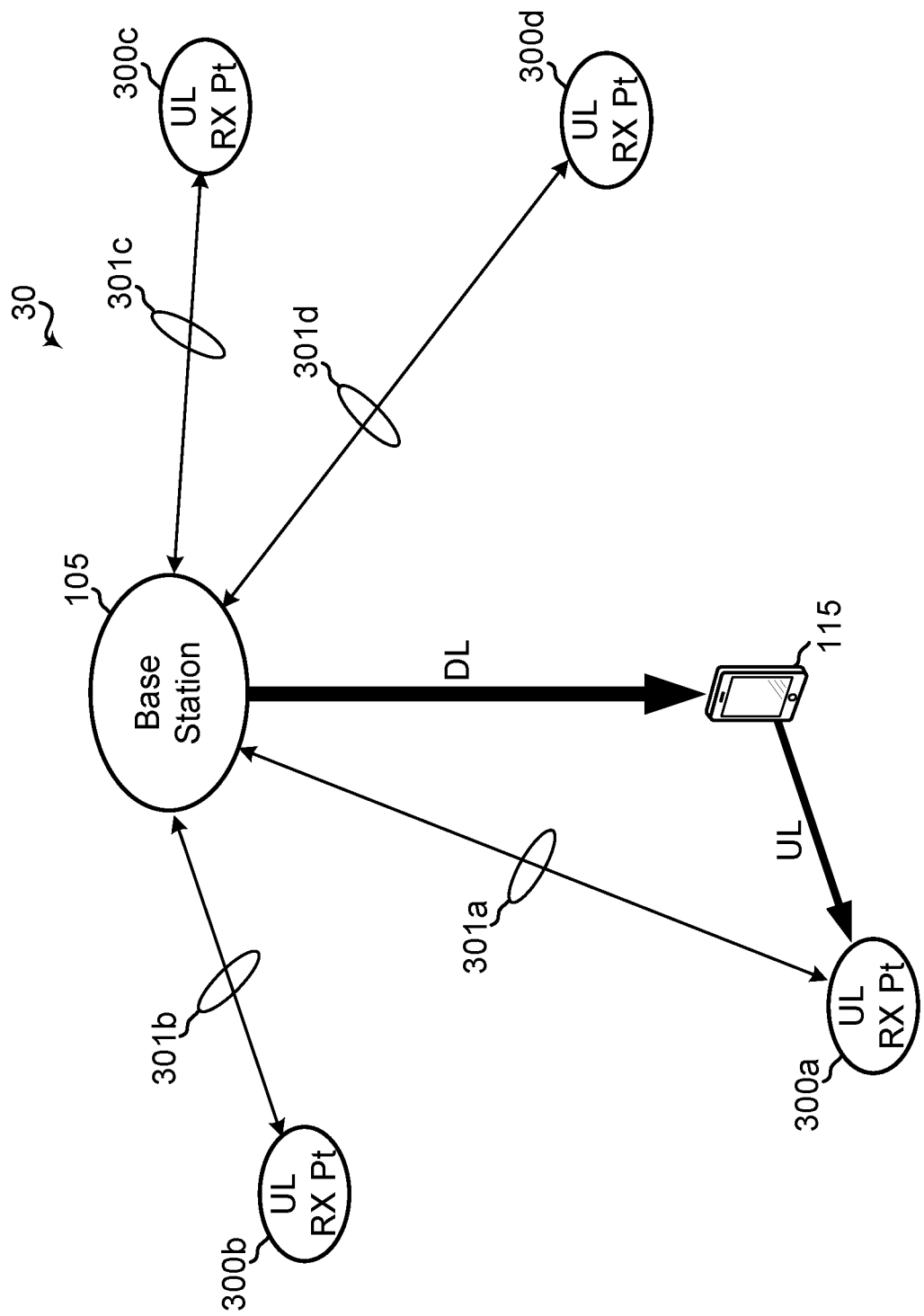
FIG. 3 is a block diagram illustrating an example wireless communication system that supports a shared transmit power control for uplink data and control channels between a UE and an uplink receive point according to one or more aspects of the present disclosure.

FIG. 3 is a block diagram illustrating an example wireless communication system 30 that supports a shared transmit power control for uplink data and control channels between a UE 115 and an uplink receive point 300a according to one or more aspects of the present disclosure. In order to improve coverage and capacity of uplink communication, an "uplink dense" deployment may be considered. An uplink dense deployment provides an asymmetric downlink/uplink densification, in which more network nodes, such as uplink receive points 300a-300d, are deployed to facilitate uplink communications from UEs, such as UE 115, within wireless communication system. While UE 115 maintains communication with a serving base station, such as base station 105, which transmits downlink signals to UE 115, UE 115's uplink signals and channels are transmitted and received by one of the multiple uplink receive points, uplink receive points 300a-300d.

Each of uplink receive points 300a-300d is connected to base station 105 via backhauls 301a-301d. By increasing the density of uplink receive points relative to serving base stations, the likelihood is that UE 115 will transmit its uplink to an uplink receive point, uplink receive point 300a, with a reduced path loss. This may further help to relieve any bottleneck created by uplink coverage by the serving base stations. The uplink dense deployment may further help in term of deployment cost and complexity because uplink receive points, such as uplink receive points 300a-300d, do not transmit any downlink signaling. The functionality of uplink receive points 300a-300d include receiving uplink signals and communicating those uplink signals to the serving base stations, such as base station 105, either with or without any processing.

The closed loop power control adjustment states are separate for uplink data channels (e.g., PUSCH) and uplink control channels (e.g., PUCCH) and may be represented by the following equations:

$$P_{PUSCH,b,f,c}(i, j, q_d, l) = \min \left\{ \begin{array}{l} P_{CMAX,f,c}(i), \\ P_{O_{PUSCH},b,f,c}(j) + 10\log_{10}\left(2^{\mu} \cdot M_{RB,b,f,c}^{PUSCH}(i)\right) + \\ a_{b,f,c}(j) \cdot PL_{b,f,c}(q_d) + \Delta_{TF,b,f,c}(i) + f_{b,f,c}(i, l) \end{array} \right\} \quad (1)$$

$$P_{PUCCH,b,f,c}(i, q_u, q_d, l) = \min \left\{ \begin{array}{l} P_{CMAX,f,c}(i), \\ P_{O_{PUCCH},b,f,c}(q_u) + 10\log_{10}\left(2^{\mu} \cdot M_{RB,b,f,c}^{PUCCH}(i)\right) + PL_{b,f,c}(q_d) + \\ \Delta_{F\ PUCCH}(F) + \Delta_{TF,b,f,c}(i) + g_{b,f,c}(i, l) \end{array} \right\} \quad (2)$$

For each uplink data and control closed loop power control, UE 115 can be configured with one adjustment state (closed loop index l=0) or two separate adjustment states (closed loop indices l=0, 1). Overall, up to four different adjustment states across both uplink data and control channel transmissions in a given component carrier or bandwidth part. In legacy operations, UE 115 may maintain adjustment states separately based on TPC commands received in downlink control messages, such as downlink control information (DCI) messages. If accumulation is enabled at UE 115, the TPC commands may be accumulated per adjustment state.

For operations to configure uplink data channel transmission for UEs, such as UE 115, UE 115 may receive various downlink control messages from base station 105 depending on the purpose of the uplink data channel transmission. For example, in random access situations, the random access response (RAR) downlink channel for the 4-step random access procedure includes a TPC command in message 2 (MSG2) or the second message (MSGB) for the 2-step random access procedure with a fallback RAR for the uplink data channel of message 3 (MSG3) (for the closed loop index l=0). Additionally, DCI formats scheduling uplink data channels (e.g., DCI formats 0_0/0_1/0_2) include a TPC field for the closed loop index of the scheduled uplink data channel. DCI format 2_2 (e.g., a group-common DCI) with a cyclic redundancy check (CRC) scrambled with a TPC uplink data-specific identifier (e.g., TPC-PUSCH-radio network temporary identifier (RNTI)) indicates the closed loop index as well as a TPC command for a group of UEs.

For operations to configure uplink control channel transmission for UEs, such as UE 115, UE 115 also may receive various downlink control messages from base station 105 depending on the purpose of the uplink control channel transmission. For example, in the random access procedures, the MSGB message with success RAR includes a TPC command for uplink control channel transmissions (for closed loop index l=0).

Additionally, DCI formats scheduling downlink and uplink control channels for corresponding hybrid automatic receive request (HARQ) acknowledgement information (e.g., DCI formats 1_0/1_1/1_2) include a TPC field for the closed loop index of the scheduled uplink control channel. DCI format 2_2 (e.g., group-common DCI) with CRC scrambled with a TPC uplink control-specific identifier (e.g., TPC-PUCCH-RNTI) indicates the closed loop index as well as a TPC command for a group of UEs.

An uplink data channel power control configuration may indicate the same power control adjustment state for both uplink data channel and sounding reference signal (SRS) transmissions. Where a UE, such as UE 115, is not configured for uplink data channel transmissions on an active uplink bandwidth part of a carrier of a serving cell, such as base station 105, or the uplink data channel power control configuration indicates, a separate power control adjustment state may be used by SRS and uplink data channel transmissions. While this sharing of closed loop power control adjustment state between SRS and PUSCH power control is currently defined, there is currently no sharing of the same closed loop power control adjustment state between uplink data channel and uplink control channel transmissions.

However, sharing between uplink data channel and control channel transmissions can be beneficial for uplink dense deployments. When the uplink receive point, such as uplink receive points 300a-300d, is different than the downlink point, base station 105, the path loss between the downlink point, base station 105, and the uplink receive point, uplink receive points 300a-300d, can be very different. Moreover, where the receive strength of the path loss is used in power control formula, it corresponds to the downlink path loss, which can be much larger than the uplink path loss from an uplink receive point, such as uplink receive points 300a-300d, resulting in a determination of an unnecessarily high transmit power. TPC commands can be used to adjust the power and correct this "over-powering."

The reality of such a scenario is that these power adjustments are applicable to both the uplink data and control channel transmission toward the uplink receive point, such as uplink receive points 300a-300d. Typically, a large correction would exist in this case resulting in multiple TPC commands. Further, an early power control adjustment, such as during or just after initial access, would be beneficial for adjusting to the appropriate transmit power. However, where a TPC command cannot be shared between both uplink data and control channel transmissions, the number of TPC commands to be sent may be especially large in order to adjust both transmit powers for uplink data and control channel transmissions to an appropriate level. This large number of TPC commands adjusting both uplink data and control channel transmit powers creates are large and unnecessary overhead and may further result in delayed power control adjustment. The various aspects of the present disclosure are directed to a shared TPC for uplink data and control channel transmissions.

Figure 4:
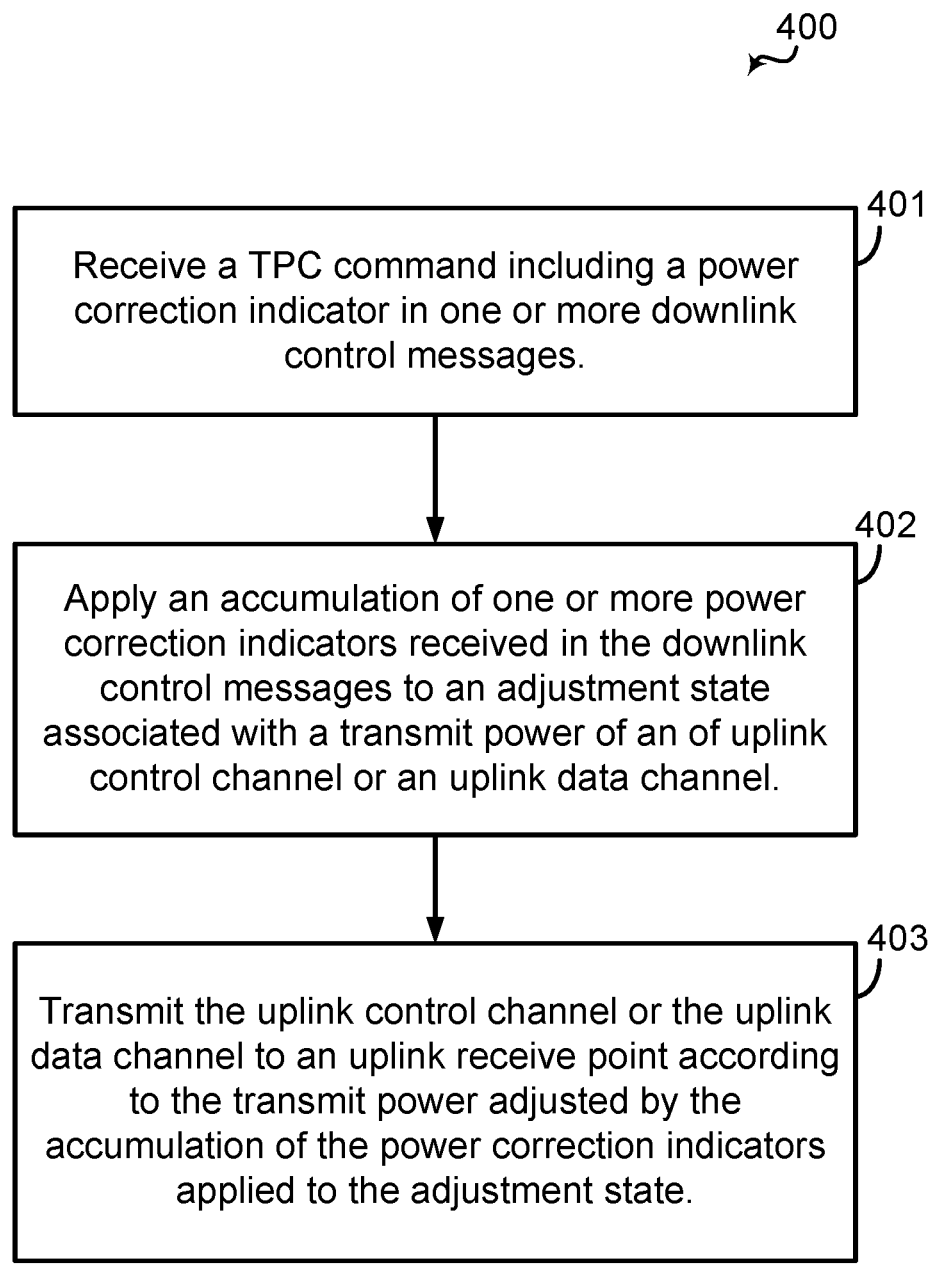
FIG. 4 is a block diagram illustrating an example process that supports a shared TPC for uplink data and control channels according to one or more aspects of the present disclosure.
Figure 7:
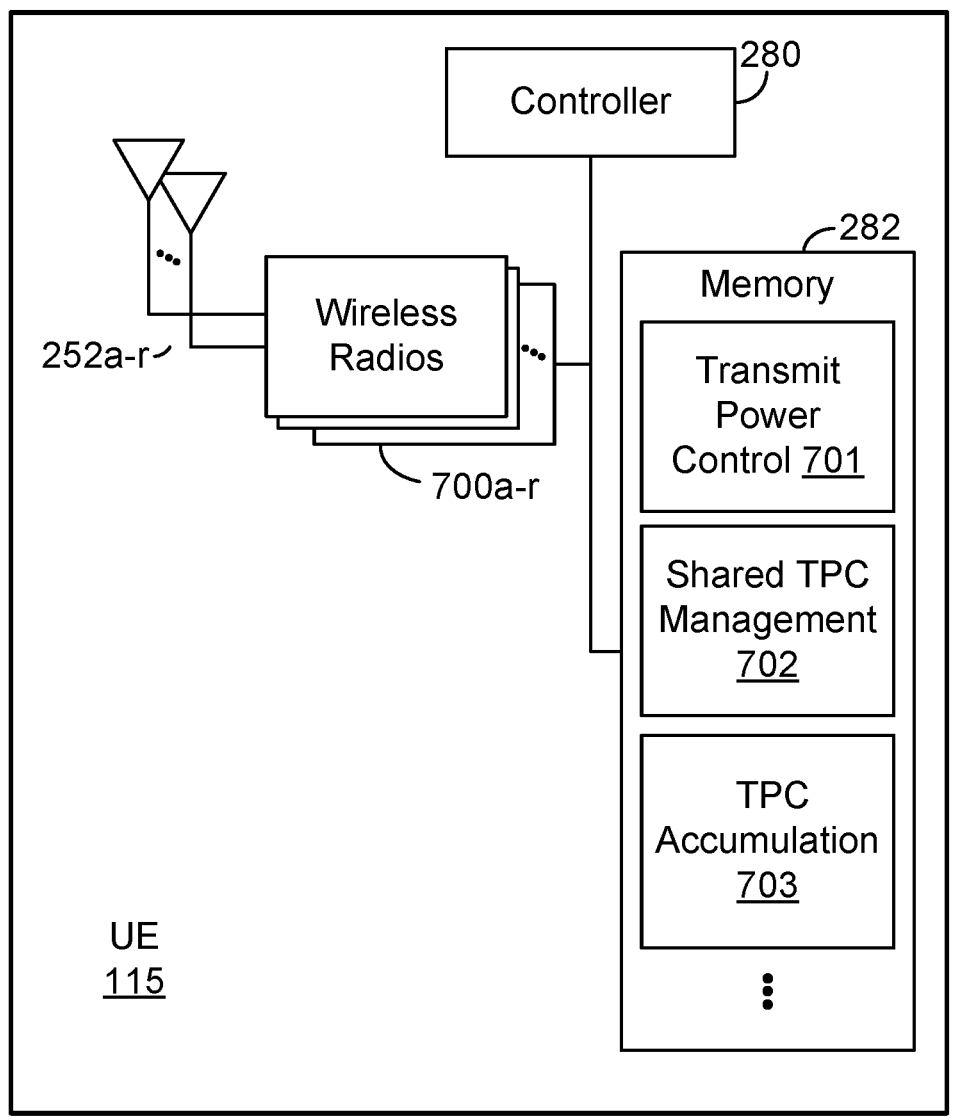
FIG. 7 is a block diagram of an example UE that supports a shared TPC for uplink data and control channels according to one or more aspects of the present disclosure.

FIG. 4 is a flow diagram illustrating an example process 400 that supports a shared TPC for uplink data and control channels according to one or more aspects. Operations of process 400 may be performed by a UE, such as UE 115 described above with reference to FIGS. 1, 2, 3, or a UE described with reference to FIG. 7. For example, example operations (also referred to as "blocks") of process 400 may enable UE 115 to supports a shared TPC for uplink data and control channels. An example UE, such as UE 115, may include controller 280, which operates to execute logic or computer instructions stored in memory 282, as well as controlling the components of UE 115 that provide the features and functionality of UE 115. UE 115, under control of controller 280, transmits and receives signals via wireless radios 700a-r and antennas 252a-r. Wireless radios 700a-r include various components and hardware, as illustrated in FIG. 2 for UE 115, including modulator and demodulators 254a-r, MIMO detector 256, receive processor 258, transmit processor 264, and TX MIMO processor 266.

At block 401, a UE, such as UE 115, receives a TPC command in one or more downlink control messages from a serving base station, wherein the TPC command includes a power correction indicator. UE 115, under control of controller 280, executes transmit power control logic 701, stored in memory 282. The features and functionality enabled on execution of the instructions and code (referred to herein as the "execution environment) of transmit power control logic 701 provides UE 115 with the capability to manage its transmit power for uplink transmissions. Within the execution environment of transmit control power logic 701, UE 115 recognizes the TPC command including the power correction indicators within received downlink control messages, such as downlink DCI, uplink DCI, DCI format 2_2, RAR PDSCH, and the like, received via antennas 252a-r and wireless radios 700a-r.

At block 402, the UE applies an accumulation of one or more power correction indicators received in the one or more downlink control messages to an adjustment state associated with a transmit power of an of uplink control channel and an uplink data channel. UE 115, under control of controller 280, executes shared TPC management logic 702, stored in memory 282. The execution environment of shared TPC management logic 702 provides UE 115 the functionality according to the aspects described herein for a shared TPC for uplink data and control channels. UE 115, within the execution environment of shared TPC management logic 702, accumulates one or more power correction indicators as received in the downlink control messages. UE 115 may then applies the TPC command indicated in a downlink control message to the closed loop adjustment states of both uplink data and control channel transmissions.

It should be noted that this mode of operation for sharing uplink power control adjustment states between uplink data and control channel transmissions may be configured per component carrier or per BWP manner. Furthermore, the sharing mode of operation is configured when the UE, such as UE 115, to indicate it is capable of this feature through UE capability signaling.

At block 403, the UE transmits to an uplink receive point, the uplink control channel or the uplink data channel according to the transmit power adjusted by the accumulation of the one or more power correction indicators applied to the adjustment state, wherein the uplink receive point is different from the serving base station. UE 115 may then transmit data or control signals via the uplink control or data channel using a transmit power that has been adjusted by the TPC accumulation. UE 115 adjusts the transmit power within wireless radios 700a-r and transmits the uplink signals via antennas 252a-r.

It should be noted that in some aspects, the present disclosure provides techniques applicable in an uplink dense deployment in which TPC may be shared between uplink data and control channels in order to reduce the overhead of power adjustments to adjust a transmit power determined based on the path loss in the downlink channel with a serving base station to a more suitable transmit power for a path loss in an uplink channel with a uplink receive point, which may be substantially different than the path loss in the downlink channel. Sharing of TPC may also allow for a UE to adjust its transmit power for uplink data and control channel transmissions more quickly.

Figure 5:
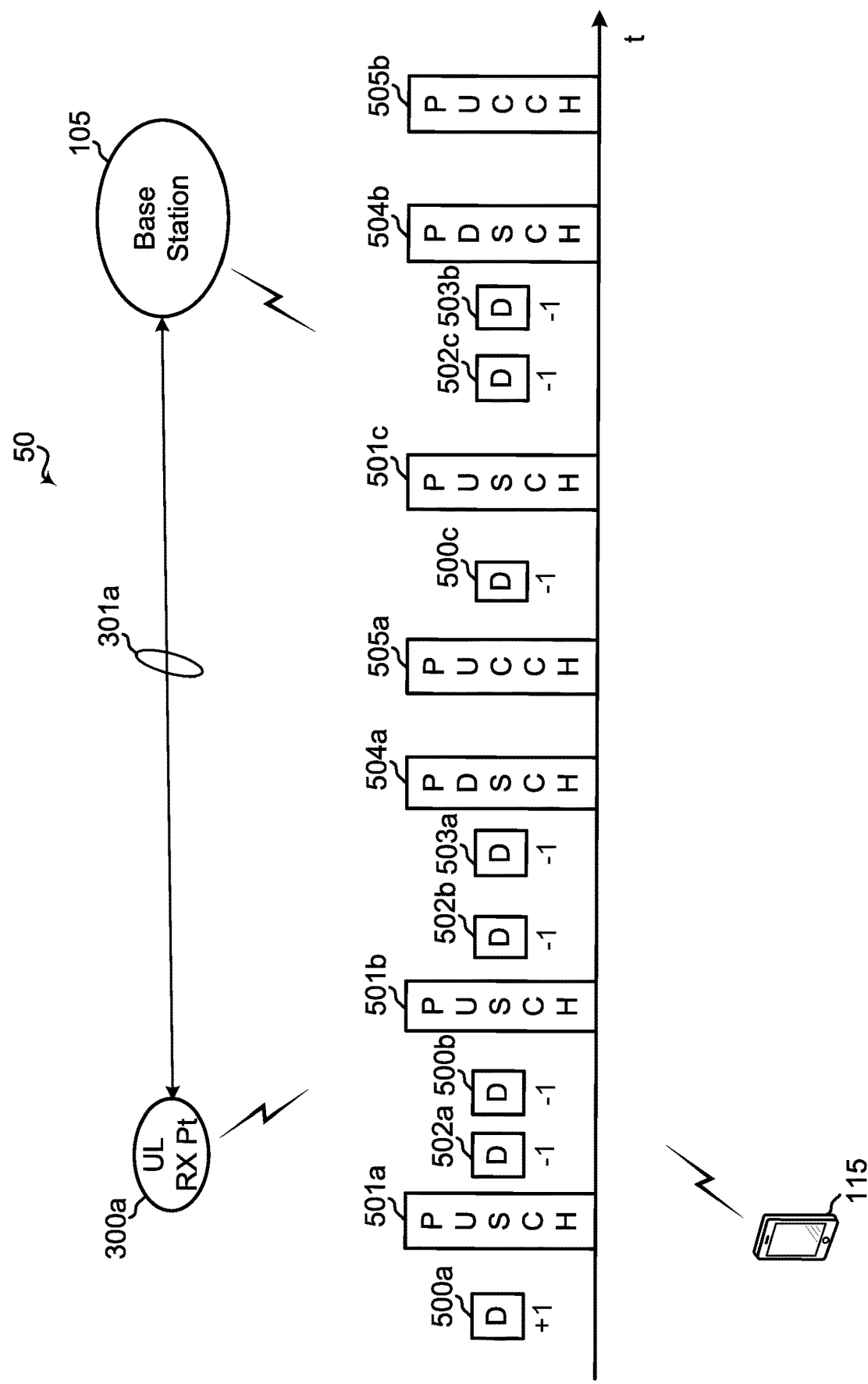
FIG. 5 is a block diagram of an example UE within a wireless communication system in communication with an uplink receive point and base station, where the example UE supports a shared TPC for uplink data and control channels according to one or more aspects of the present disclosure.

FIG. 5 is a block diagram of an example UE, UE 115, within a wireless communication system 50 in communication with an uplink receive point 300a and base station 105, where UE 115 supports a shared TPC for uplink data and control channels according to one or more aspects of the present disclosure. As noted with respect to FIGS. 3 and 4, UE 115 has established communications with base station 105 as a serving base station. Wireless communication system 50 includes an uplink dense deployment including multiple uplink receive points, such as depicted in FIG. 3. Each uplink receive point, such as uplink receive point 300a, is in communication with base station 105 via backhaul 301a.

FIG. 5 illustrates a communication sequence involving UE 115, base station 105, and uplink receive point 300a. Base station 105 transmits downlink control messages, such as DCIs 500a-c, which are uplink DCI scheduling uplink data channel transmissions and including a TPC command, DCIs 502a-c, which are downlink DCI scheduling downlink transmissions and uplink control channel transmissions and including a TPC command, and DCIs 503a-b, which are group common DCI (e.g., DCI format 2_2) including a TPC command. Underneath each of DCIs 500a-c, 502a-c, and 503a-b, is a power correction indicator, which is an indication of the power adjustment level (e.g., +1 or −1). Currently, the power correction indicator for TPC commands may indicate an adjustment, in decibels (dBs), of either −1, 0, 1, or 3. The communication sequence includes uplink data channel transmissions (PUSCH 501a-c), downlink data channel transmissions (PDSCH 504a-b), and uplink control channel transmissions (PUCCH 505a-b).

As UE 115 receives downlink signals, DCIs 500a-c, 502a-c, and 503a-b, from base station 105, it determines a transmit power using the path loss calculated based on the downlink signal from base station 105. For uplink data and control channel transmissions, UE 115 will transmit such uplink channels towards an uplink receive point, such as uplink receive point 300a. The closed loop power control process may then include receiving TPC commands via further downlink control messages from base station 105. According to the aspects of the present disclosure, UE 115 will apply the power correction indicator to each of the transmit power adjustments of the uplink data and control channel transmissions. In a first optional aspect, UE 115 will share each power correction indicator received via TPC commands to both uplink data and control channel transmission or, in a second optional aspect, UE 115 will share the power correction indicators received via certain predetermined TPC commands received.

According to the first optional aspect, each TPC command in the various downlink control messages, such as downlink DCI, uplink DCI, DCI format 2_2 with CRC scrambled with TPC-PUSCH-RNTI/TPC-PUSCH-RNTI, or in PDSCH RAR may be applied to the shared adjustment state for both of the uplink data and control channel transmissions.

According to this first optional aspect, there is a single TPC accumulation when one closed loop adjustment state index is configured. The accumulated TPC may be applied to both uplink data and control channel transmissions. UE 115 may still maintain two or more TPC accumulations when two or more closed loop adjustment state indices are configured but each of the TPC accumulations will be shared with the uplink data and control channel transmissions. For example, the first TPC accumulation may be applied to uplink data and control channel transmissions associated with l=0, and a next TPC accumulation may be applied to uplink data and control channel transmissions associated with l=1.

In implementation of the first optional aspect, the TPC accumulation may be updated in alternate manners. For example, in a first alternative implementation, the TPC accumulation may be updated for the uplink data channel transmission occasions, with the accumulated adjustment value applied to subsequent uplink control channel transmissions until the next uplink data channel transmission occasion. Thus, in the first alternative implementation the accumulated TPC values of the uplink data channel transmissions may be assumed and applied to uplink control channel transmissions.

In an example operation of the first alternative implementation, the TPC accumulation is updated on each uplink data channel transmission occasion. DCI 500a includes a TPC command with a power correction indicator of +1. During the uplink data channel transmission occasion, in which PUSCH 501a is transmitted, UE 115 sets the TPC accumulation to +1 (f=+1, where f represents the TPC accumulation). UE 115 uses the TPC accumulation to adjust the transmit power for transmission of PUSCH 501a. DCI 502a includes a TPC command with a power correction indicator of −1, and DCI 500b includes a TPC command with a power correction indicator of −1. At the next uplink data channel transmission occasion, in which PUSCH 501b is transmitted, UE 115 sets the TPC accumulation to −1 (f=+1−1−1=−1) and uses this TPC accumulation to adjust the transmit power for transmission of PUSCH 501b.

UE 115 receives the next DCIs, DCIs 502b and 503a, each of which includes a TPC command with a power correction indicator of −1. The next transmission occasion in the sequence of communications is PDSCH 504a with downlink transmissions from base station 105. The next uplink channel transmission occasion is an uplink control channel transmission occasion, PUCCH 505a. As this next occasion is an uplink control channel transmission occasion, UE 115 does not, in operation of the first alternative implementation, update the TPC accumulation with the power correction indicators from DCIs 502b and 503a. Instead, UE 115 would adjust the transmit power for PUCCH 505a using the current TPC accumulation of −1 (f=−1).

UE 115 receives the next DCI, DCI 500c with a TPC command with a power correction indicator of −1. At the following transmission occasion, which is an uplink data channel transmission occasion, PUSCH 501c, UE 115 sets the TPC accumulation to −4 (f=−1−1−1−1=−4). UE 115 adjusts the transmit power for PUSCH 501c using the adjusted TPC accumulation of −4. For the remainder of the communication sequence illustrated in FIG. 5, the subsequent transmission occasions, PDSCH 504b and PUCCH 505b, do not trigger UE 115 to adjust the TPC accumulation with the subsequent power correction indicators received in DCIs 502c and 503b. Therefore, for PUCCH 505b, UE 115 will use the current TPC accumulation.

In a second alternative implementation of the first optional aspect, the TPC accumulation may be updated for the uplink control channel transmission occasions, with the accumulated TPC value applied to subsequent uplink data channel transmissions until the next uplink control channel transmission occasion. Thus, in the second alternative implementation the TPC accumulation of the uplink control channel transmissions may be assumed and applied to uplink data channel transmissions.

In an example operation of the second alternative implementation, the TPC accumulation is updated on each uplink control channel transmission occasion. The communication sequence illustrated in FIG. 5 reflects two uplink control channel transmission occasions, PUCCH 505a and 505b. During the first two uplink data channel transmission occasions, PUSCH 501a and 501b, UE 115 will apply a TPC accumulation of 0, as none of the power correction indicators in the TPC commands included in DCIs 500a or 502a are used in updating the TPC accumulation. At the first uplink control channel transmission occasion, PUCCH 505a, UE 115 sets the TPC accumulation to −3 (f=+1−1−1−1−1=−3) and uses this TPC accumulation to adjust the transmit power for PUCCH 505a. UE 115 will apply this same TPC accumulation of −3 when transmitting PUSCH 501c, without addition of the power correction indicator of −1 received in the TPC command in DCI 500c. At the next uplink control channel transmission occasion, PUCCH 505b, UE 115 sets the TPC accumulation to −6 (f=−3−1−1−1=−6) and uses this TPC accumulation to adjust the transmit power for PUCCH 505b.

In a third alternative implementation of the first optional aspect, the TPC accumulation may be updated for each uplink data and control channel transmission occasion. Thus, in the third alternative implementation the TPC accumulation will be updated and applied to every uplink data and control channel transmission occasion.

In an example operation of the third alternative implementation, the TPC accumulation is updated on each uplink data and control channel transmission occasion. As such, UE 115 applies the TPC accumulation of +1 is applied to adjust the transmit power for PUSCH 501a, applies the TPC accumulation of −1 (f=+1−1−1=−1) to adjust the transmit power for PUSCH 501b, applies the TPC accumulation of −3 (f=−1−1−1=−3) to adjust the transmit power for PUCCH 505a, applies the TPC accumulation of −4 (f=−3−1=−4) to adjust the transmit power for PUSCH 501c, and applies the TPC accumulation of −6 (f=−4−1−1=−6) to adjust the transmit power for PUCCH 505b. According to the third alternative implementation, the power correction indictors of the TPC commands included in DCIs 300a-c, 502a-c, and 503a-b, are used by UE 115 in setting of the TPC accumulation at each uplink data and control channel transmission occasion.

According to the second optional aspect, UE 115 maintains separate closed loop adjustment states for uplink data and control channel transmissions but certain predetermined TPC commands are applied to both adjustment states. The predetermined TPC commands that are applied to both can include TPC commands indicated during random access procedures, TPC commands in group common downlink control messages, or the like. The application of power correction indicators in TPC commands to a TPC accumulation in a random access procedure allows for early power control adjust for both uplink data and control channel transmissions due to the differences in path loss between the downlink channel with base station 105 and the uplink channel with uplink receive point 300a. This implementation may include TPC command in RAR PDSCH for 4-step random access (e.g., MSG2 PDSCH or MSGB PDSCH with fallbackRAR) or the TPC command in RAR PDSCH for 2-step random access (e.g., MSGB PDSCH with successRAR) or the TPC command in MSGB PDCCH (e.g., DCI format 1_0 with CRC scrambled by CRNTI) or the TPC command in DCI format 0_0 with CRC scrambled with TC-RNTI (UL grant for retransmission of MSG3).

For identifying predetermined TPC commands in group common downlink control messages may allow UE 115 to distinguish between TPC commands specific to uplink data channel transmissions or uplink control channel transmissions versus TPC commands common to both uplink data and control channel transmissions. For example, TPC commands in DCI format 2_2 are common to both uplink data and control channel transmission, while TPC commands in scheduling DCIs are specific to uplink data or control channel transmissions when scheduling such transmissions.

The CRC of the DCI format 2_2 can be either TPC-PUSCH-RNTI or TPC-PUSCH-RNTI or another new RNTI to distinguish when the power correction indicator of the TPC command in DCI format 2_2 is applied to both uplink data and control channel transmissions. Fallback downlink DCIs (e.g., format 10) or fallback uplink DCI (e.g., format 00) provide another way to distinguish between TPC commands specific to PUCCH or PUSCH versus TPC commands common to both. For non-fallback uplink or downlink DCIs (DCI formats 1_1/1_2 or 0_1/0_2), the DCI itself can indicate whether the TPC command is applied to both uplink data and control channel transmissions or not. For other TPC commands (other than the predetermined TPC commands, as described above), it will apply to either the uplink data channel transmission or the uplink control channel transmission but not both.

In one example implementation of the second optional aspect, as illustrated in FIG. 5, UE 115 may be configured to identify group common DCIs, DCIs 502*a-c*, for applying the power correction indicator of the TPC command received in DCIs 502*a-c*. UE 115 maintains separate TPC accumulations for uplink data channel transmissions and uplink control channel transmissions. At the first uplink data channel transmission occasion, PUSCH 501*a*, UE 115 receives the data transmission-specific TPC command received at DCI 500*a* and adjusts the transmit power for PUSCH 501*a* transmission with an uplink data channel-specific TPC accumulation of +1 (f=+1, wherein f here represents the TPC accumulation for uplink data channel transmissions). At the next uplink data channel transmission occasion for PUSCH 501*b*, UE 115 has received additional power correction indicators in the TPC command of DCI 502*a*, a group common DCI, and DCI 500*b*, an uplink data channel-specific TPC command. UE 115 may then adjust the transmit power for transmission of PUSCH 501*b* using the uplink data channel-specific TPC accumulation of −1 (f=+1−1−1=−1).

The next uplink transmission occasion includes an uplink control channel transmission occasion for PUCCH 505*a*. At this point, UE 115 has received two group common DCIs, DCIs 502*a* and 502*b*, and one uplink control-specific TPC command in DCI 503*a*. Thus, UE 115 may adjust the transmit power for transmission of PUCCH 505*a* using an uplink control channel-specific TPC accumulation of −3 (g=−1−1−1=−3, where g represents the TPC accumulation for uplink control channel transmissions).

At the transmission occasion for PUSCH 501*c*, UE 115 has received the second group common DCI, DCI 502*b*, and an additional uplink data transmission-specific DCI, DCI 500*c*. UE 115 may then adjust the transmit power for transmission of PUSCH 501*c* using a TPC accumulation of −3 (f=−1−1−1=−3). Similarly, at the transmission occasion for PUCCH 505*b*, UE 115 has received a third group common DCI, DCI 502*c*, and a second uplink control-specific DCI, DCI 503*b*. UE may then adjust the transmit power of PUCCH 505*b* using an uplink data channel-specific TPC accumulation of −5 (g=−3−1−1=−5).

Figure 6:
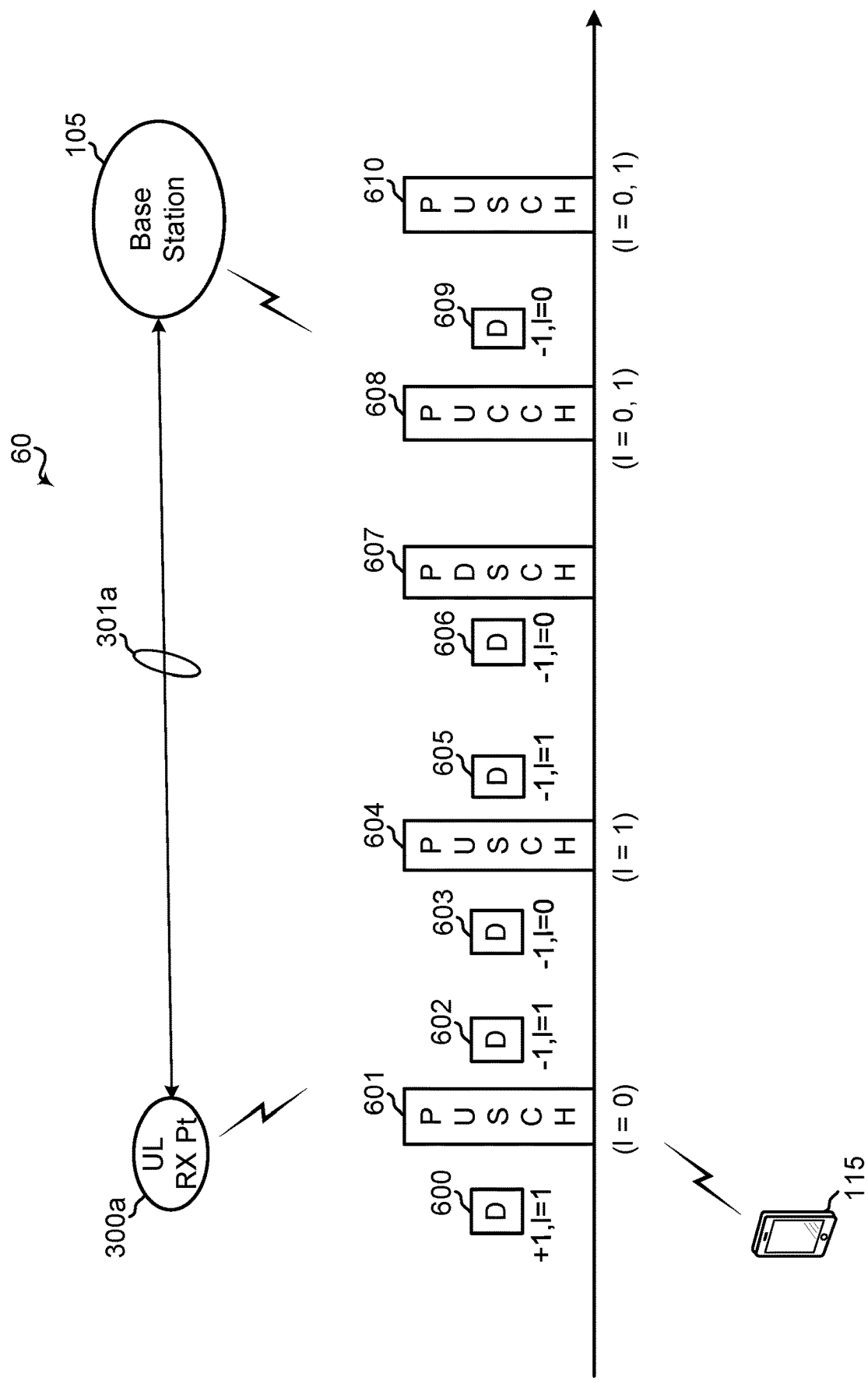
FIG. 6 is a block diagram of an example UE within a wireless communication system in communication with an uplink receive point and base station, where the example UE supports a shared TPC for uplink data and control channels according to one or more aspects of the present disclosure.

FIG. 6 is a block diagram of an example UE, UE 115, within a wireless communication system 60 in communication with an uplink receive point 300*a* and base station 105, where UE 115 supports a shared TPC for uplink data and control channels according to one or more aspects of the present disclosure. As noted with respect to FIGS. 3-5, UE 115 has established communications with base station 105 as a serving base station. Wireless communication system 60 includes an uplink dense deployment including multiple uplink receive points, such as depicted in FIG. 3. Each uplink receive point, such as uplink receive point 300*a*, is in communication with base station 105 via backhaul 301*a*.

As indicated above, UE 115 may maintain more than one closed loop power control adjustment state index for uplink data and control channel transmissions. Where multiple such indices are configured for either uplink data or control channel transmissions, the power correction indicators in the TPC commands received by UE 115 may be applied to both uplink data and control channel closed loop adjustment states. For example, DCI 600, which is an uplink DCI scheduling PUSCH, includes a TPC command with a power correction indicator of +1 applicable to a closed loop power control adjustment state index l=1. UE 115 can apply this power correction indicator to the TPC accumulation associated with the closed loop power control adjustment state index l=1 and apply the power adjustment to either or both of the uplink data or control channel transmissions configured for the l=1 adjustment state index. DCI 602, which is a group common DCI including a TPC command with a power correction indicator of −1 applicable to the closed loop power control adjustment state index l=1. DCI 603 is an uplink DCI scheduling PUSCH including a TPC command with a power correction indicator of −1 applicable to a closed loop power control adjustment state index l=0. UE 115 can apply this power correction indicator to the TPC accumulation associated with the closed loop power control adjustment state index l=0 and apply the power adjustment to either or both of the uplink data or control channel transmissions configured for the l=0 adjustment state index. DCIs 605 and 609 are group common DCIs including TPC commands both with a power correction indicator of −1 applicable to a closed loop power control adjustment state indices l=1 and l=0, respectively. DCI 606 is a downlink DCI scheduling PDSCH and PUCCH including a TPC command with a power correction indicator of −1 applicable to a closed loop power control adjustment state index l=0.

When TPC accumulation is active, UE 115 will apply each power correction indicator to the corresponding TPC accumulation. For example, after receiving DCI 609, the TPC accumulation associated with l=0 would be f(l)=−3=−1−1−1, and the TPC accumulation associated with l=1 would be f(l)=−1=1−1−1. The associated TPC accumulation may then be applied to adjust the transmit power for uplink control or data channel transmissions. For example, PUSCH 601 is configured with closed loop power control adjustment state index l=0. No power correction indicators have been accumulated at this point, to UE 115 does not apply a transport power adjustment to PUSCH 601. PUSCH 604 is configured with closed loop power control adjustment state index l=1. At this point, the TPC accumulation associated with l=1 is f(l)=−1. Thus, UE 115 applies the TPC accumulation to adjust the transmit power for PUSCH 604. PUCCH 608 is configured with closed loop power control adjustment state indices l=0 and l=1. At this point, the TPC accumulation associated with l=0 is f(l)=−2=−1−1 and with l=1 is f (l)=−1=1−1−1. UE 115 applies the TPC accumulation for both l=1 and l=1 (f(l)=−3=−2−1) to adjust the transmit power for PUCCH 608. PUSCH 610 is configured with closed loop power control adjustment state indices l=0 and l=1. At this point, the TPC accumulation associated with l=0 is f(l)=−3=−1−1−1 and with l=1 is f(l)=−1=1−1−1. UE 115 applies the TPC accumulation for both l=0 and l=1 (f(l)=−4=−3−1) to adjust the transmit power for PUSCH 610.

In a first alternative implementation, the power correction indicators in the received TPC commands are shared for TPC accumulation between the uplink data and control channel adjustment states when it is associated with the first closed loop index (l=0). For example, PUSCH 601 is configured with closed loop power control adjustment state index 0, and PUCCH 608 and PUSCH 610 are configured with both closed loop power control adjustment state indices 0 and 1. According to the first alternative implementation, the power correction indicators in the received TPC commands received in DCIs 603, 606, and 609, which are configured with adjustment state index, l=0, are shared for TPC accumulation and shared for transmit power adjustment for PUSCH 601 and the l=0 adjustment state index of PUCCH 608 and PUSCH 610.

In a second alternative implementation, the power correction indicators in the received TPC commands may be shared for TPC accumulation between uplink data and control channel adjustment states regardless of its association with the first or second closed loop indices (l=0 or l=1). In such second alternative implementation, the power correction indicator of the TPC command may be applied to the corresponding closed loop index (l=0 or l=1) of both uplink data or control channel closed loop adjustment states. For example, the TPC accumulation associated with l=0 may be applied for transmit power adjustment for PUSCH 601 and the l=0 adjustment state index of PUCCH 608 and PUSCH 610, and the TPC accumulation associated with l=0 may be applied for transmit power adjustment for PUSCH 604 and the l=1 adjustment state index of PUCCH 608 and PUSCH 610.

Alternatively, the power correction indicator of the TPC command may be applied to all closed loop indices (l=0 and l=1) of both uplink data and control channel closed loop adjustment states. For example, if two closed loop indices are configured for each of the uplink data and control channel transmissions, power correction indicator of the TPC command may be applied to all four adjustment states (l=0 of both uplink data and control channel transmissions, as well as l=1 of both uplink data and control channel transmissions). As illustrated in FIG. 6, the combined TPC accumulation associated with l=0 and l=1 may be applied for transmit power adjustment for each adjustment state configured for PUSCH 601, 604, and 610 and PUCCH 608.

It is noted that one or more blocks (or operations) described with reference to FIG. 4 may be combined with one or more blocks (or operations) described with reference to another of the figures. For example, one or more blocks (or operations) of FIG. 4 may be combined with one or more blocks (or operations) of FIG. 5. Additionally, or alternatively, one or more operations described above with reference to FIGS. 1-3 and 5 may be combined with one or more operations described with reference to FIG. 6.

In one or more aspects, techniques for supporting a shared TPC for uplink data and control channels according to one or more aspects of the present disclosure may include additional aspects, such as any single aspect or any combination of aspects described below or in connection with one or more other processes or devices described elsewhere herein. In one or more aspects, supporting a shared TPC for uplink data and control channels according to one or more aspects of the present disclosure may include a UE configured to receive a TPC command in one or more downlink control messages from a serving base station, wherein the TPC command includes a power correction indicator. The UE is further configured to apply an accumulation of one or more power correction indicators received in the one or more downlink control messages to an adjustment state associated with a transmit power of an of uplink control channel and an uplink data channel. The UE is also configured to transmit, to an uplink receive point, the uplink control channel or the uplink data channel according to the transmit power adjusted by the accumulation of the one or more power correction indicators applied to the adjustment state, wherein the uplink receive point is different from the serving base station.

Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

A first example aspect of wireless communication performed by a UE may include receiving, by the UE, a TPC command in one or more downlink control messages from a serving base station, wherein the TPC command includes a power correction indicator; applying, by the UE, an accumulation of one or more power correction indicators received in the one or more downlink control messages to an adjustment state associated with a transmit power of an of uplink control channel or an uplink data channel; and transmitting, by the UE to an uplink receive point, the uplink control channel or the uplink data channel according to the transmit power adjusted by the accumulation of the one or more power correction indicators applied to the adjustment state, wherein the uplink receive point is different from the serving base station.

In a second aspect, alone or in combination with the first aspect, wherein the one or more power correction indicators of the accumulation corresponds to each power correction indicator received in the one or more downlink control messages, and wherein the adjustment state is shared by the uplink control channel and the uplink data channel.

In a third aspect, alone or in combination with one or more of the first aspect or the second aspect, wherein the applying the accumulation of the one or more power correction indicators includes: applying the accumulation of the one or more power correction indicators to the adjustment state of the transmit power at each uplink data channel transmission occasion, wherein the accumulation includes the one or more power correction indicators as accumulated as of a time of the uplink data channel transmission occasion.

In a fourth aspect, alone or in combination with one or more of the first aspect through the third aspect, wherein the applying the accumulation of the one or more power correction indicators includes: applying the accumulation of the one or more power correction indicators to the adjustment state of the transmit power at each uplink control transmission occasion, wherein the accumulation includes the one or more power correction indicators as accumulated as of a time of the uplink control transmission occasion.

In a fifth aspect, alone or in combination with one or more of the first aspect through the fourth aspect, wherein the one or more power correction indicators of the accumulation corresponds to one or more common power correction indicators included in one or more predetermined common TPC commands, and wherein the adjustment state corresponding to the uplink control channel and the uplink data channel includes an uplink control adjustment state and an uplink data adjustment state.

In a sixth aspect, alone or in combination with one or more of the first aspect through the fifth aspect, wherein the receiving the TPC command in the one or more downlink control messages includes: receiving the one or more predetermined common TPC commands in one or more predetermined common downlink control messages of the one or more downlink control messages, receiving one or more uplink data-specific TPC commands in one or more uplink data-specific downlink control messages of the one or more downlink control messages, and receiving one or more uplink control-specific TPC commands in one or more uplink control-specific downlink control messages of the one or more downlink control messages, wherein the applying the accumulation of one or more power correction indicators includes: applying the accumulation of one or more common power correction indicators to the uplink data adjustment state and the uplink control adjustment state, applying the accumulation of one or more data-specific power correction indicators in the one or more uplink data-specific TPC commands to the uplink data adjustment state, and applying the accumulation of one or more control-specific power correction indicators in the one or more uplink control-specific TPC commands to the uplink control adjustment state, and wherein the transmitting the uplink control channel and the uplink data channel includes: transmitting the uplink data channel to the uplink receive point according to the transmit power adjusted by the uplink data adjustment state, and transmitting the uplink control channel to the uplink receive point according to the transmit power adjusted by the uplink control adjustment state.

In a seventh aspect, alone or in combination with one or more of the first aspect through the sixth aspect, wherein one or more of: the uplink data adjustment state includes a plurality of uplink data adjustment states, and the uplink control adjustment state includes a plurality of uplink control adjustment states, and wherein the applying the accumulation of the one or more common power correction indicators includes one of: applying the accumulation of the one or more common power correction indicators to one or more of a first uplink data adjustment state of the plurality of uplink data adjustment states and a first control data adjustment state of the plurality of uplink data adjustment states; or applying the accumulation of the one or more common power correction indicators to one or more of the plurality of uplink data adjustment states and the plurality of uplink control adjustment states.

In an eighth aspect, alone or in combination with one or more of the first aspect through the seventh aspect, wherein the applying the accumulation of the one or more common power correction indicators to the one or more of the plurality of uplink data adjustment states and the plurality of uplink control adjustment states includes: applying the accumulation of the one or more common power correction indicators to the one or more of a corresponding one or more uplink data adjustment states of the plurality of uplink data adjustment states and a corresponding one or more uplink control adjustment states of the plurality of uplink control adjustment states.

In a ninth aspect, alone or in combination with one or more of the first aspect through the eighth aspect, wherein the one or more predetermined common TPC commands includes one or more of: the TPC command received in one or more random access messages; the TPC command received in a group common DCI message; the TPC command received in a fallback DCI message; or the TPC command received in a non-fallback DCI message.

In a tenth aspect, alone or in combination with one or more of the first aspect through the ninth aspect, wherein the one or more downlink control messages includes one or more of: random access procedure messages; and DCI messages.

In an eleventh aspect, alone or in combination with one or more of the first aspect through the tenth aspect, further including: receiving, by the UE, a configuration indicator from the serving base station, wherein the configuration indicator indicates one of one or more component carriers or one or more bandwidth parts to perform the applying and the transmitting.

In a twelfth aspect, alone or in combination with one or more of the first aspect through the eleventh aspect, further including: signaling, by the UE, a capability report to the serving base station, wherein the capability report indicates the UE is capable to perform the applying and the transmitting, wherein the configuration indicator is received after the signaling the capability report.

A thirteenth aspect includes a UE configured for wireless communication includes at least one processor; and a memory coupled to the at least one processor, wherein the at least one processor is configured: to receive, by the UE, a TPC command in one or more downlink control messages from a serving base station, wherein the TPC command includes a power correction indicator; to apply, by the UE, an accumulation of one or more power correction indicators received in the one or more downlink control messages to an adjustment state associated with a transmit power of an of uplink control channel or an uplink data channel; and to transmit, by the UE to an uplink receive point, the uplink control channel or the uplink data channel according to the transmit power adjusted by the accumulation of the one or more power correction indicators applied to the adjustment state, wherein the uplink receive point is different from the serving base station.

In a fourteenth aspect, alone or in combination with the thirteenth aspect, wherein the one or more power correction indicators of the accumulation corresponds to each power correction indicator received in the one or more downlink control messages, and wherein the adjustment state is shared by the uplink control channel and the uplink data channel.

In a fifteenth aspect, alone or in combination with one or more of the thirteenth aspect or the fourteenth aspect, wherein the configuration of the at least one processor to apply the accumulation of the one or more power correction indicators includes configuration of the at least one processor: to apply the accumulation of the one or more power correction indicators to the adjustment state of the transmit power at each uplink data channel transmission occasion, wherein the accumulation includes the one or more power correction indicators as accumulated as of a time of the uplink data channel transmission occasion.

In a sixteenth aspect, along or in combination with one or more of the thirteenth aspect through the fifteenth aspect, wherein the configuration of the at least one processor to apply the accumulation of the one or more power correction indicators includes configuration of the at least one processor: to apply the accumulation of the one or more power correction indicators to the adjustment state of the transmit power at each uplink control transmission occasion, wherein the accumulation includes the one or more power correction indicators as accumulated as of a time of the uplink control transmission occasion.

In a seventeenth aspect, along or in combination with one or more of the thirteenth aspect through the sixteenth aspect, wherein the one or more power correction indicators of the accumulation corresponds to one or more common power correction indicators included in one or more predetermined common TPC commands, and wherein the adjustment state corresponding to the uplink control channel and the uplink data channel includes an uplink control adjustment state and an uplink data adjustment state.

In an eighteenth aspect, along or in combination with one or more of the thirteenth aspect through the seventeenth aspect, wherein the configuration of the at least one processor to receive the TPC command in the one or more downlink control messages includes configuration of the at least one processor to: receive the one or more predetermined common TPC commands in one or more predetermined common downlink control messages of the one or more downlink control messages, receive one or more uplink data-specific TPC commands in one or more uplink data-specific downlink control messages of the one or more downlink control messages, and receive one or more uplink control-specific TPC commands in one or more uplink control-specific downlink control messages of the one or more downlink control messages, wherein the configuration of the at least one processor to apply the accumulation of one or more power correction indicators includes configuration of the at least one processor to: apply the accumulation of one or more common power correction indicators to the uplink data adjustment state and the uplink control adjustment state, apply the accumulation of one or more data-specific power correction indicators in the one or more uplink data-specific TPC commands to the uplink data adjustment state, and apply the accumulation of one or more control-specific power correction indicators in the one or more uplink control-specific TPC commands to the uplink control adjustment state, and wherein the configuration of the at least one processor to transmit the uplink control channel and the uplink data channel includes configuration of the at least one processor to: transmit the uplink data channel to the uplink receive point according to the transmit power adjusted by the uplink data adjustment state, and transmit the uplink control channel to the uplink receive point according to the transmit power adjusted by the uplink control adjustment state.

In a nineteenth aspect, along or in combination with one or more of the thirteenth aspect through the eighteenth aspect, wherein one or more of: the uplink data adjustment state includes a plurality of uplink data adjustment states, and the uplink control adjustment state includes a plurality of uplink control adjustment states, and wherein the configuration of the at least one processor to apply the accumulation of the one or more common power correction indicators includes configuration of the at least one processor to one of: apply the accumulation of the one or more common power correction indicators to one or more of a first uplink data adjustment state of the plurality of uplink data adjustment states and a first control data adjustment state of the plurality of uplink data adjustment states; or apply the accumulation of the one or more common power correction indicators to one or more of the plurality of uplink data adjustment states and the plurality of uplink control adjustment states.

In a twentieth aspect, along or in combination with one or more of the thirteenth aspect through the nineteenth aspect, wherein the configuration of the at least one processor to apply the accumulation of the one or more common power correction indicators to the one or more of the plurality of uplink data adjustment states and the plurality of uplink control adjustment states includes configuration of the at least one processor: to apply the accumulation of the one or more common power correction indicators to the one or more of a corresponding one or more uplink data adjustment states of the plurality of uplink data adjustment states and a corresponding one or more uplink control adjustment states of the plurality of uplink control adjustment states.

In a twenty-first aspect, along or in combination with one or more of the thirteenth aspect through the twentieth aspect, wherein the one or more predetermined common TPC commands includes one or more of: the TPC command received in one or more random access messages; the TPC command received in a group common DCI message; the TPC command received in a fallback DCI message; or the TPC command received in a non-fallback DCI message.

In a twenty-second aspect, along or in combination with one or more of the thirteenth aspect through the twenty-first aspect, wherein the one or more downlink control messages includes one or more of: random access procedure messages; and DCI messages.

In a twenty-third aspect, along or in combination with one or more of the thirteenth aspect through the twenty-second aspect, further including configuration of the at least one processor: to receive, by the UE, a configuration indicator from the serving base station, wherein the configuration indicator indicates one of one or more component carriers or one or more bandwidth parts to perform the applying and the transmitting.

In a twenty-fourth aspect, along or in combination with one or more of the thirteenth aspect through the twenty-third, further including configuration of the at least one processor: to signal, by the UE, a capability report to the serving base station, wherein the capability report indicates the UE is capable to execute the configuration of the at least one processor to apply and to transmit, wherein the configuration indicator is received after the signaling the capability report.

A twenty-fifth aspect includes a UE configured for wireless communication that includes means for receiving, by the UE, a TPC command in one or more downlink control messages from a serving base station, wherein the TPC command includes a power correction indicator; means for applying, by the UE, an accumulation of one or more power correction indicators received in the one or more downlink control messages to an adjustment state associated with a transmit power of an of uplink control channel or an uplink data channel; and means for transmitting, by the UE to an uplink receive point, the uplink control channel or the uplink data channel according to the transmit power adjusted by the accumulation of the one or more power correction indicators applied to the adjustment state, wherein the uplink receive point is different from the serving base station.

In a twenty-sixth aspect, alone or in combination with the twenty-fifth aspect, wherein the one or more power correction indicators of the accumulation corresponds to each power correction indicator received in the one or more downlink control messages, and wherein the adjustment state is shared by the uplink control channel and the uplink data channel.

In a twenty-seventh aspect, alone or in combination with one or more of the twenty-fifth aspect or the twenty-sixth aspect, wherein the means for applying the accumulation of the one or more power correction indicators includes: means for applying the accumulation of the one or more power correction indicators to the adjustment state of the transmit power at each uplink data channel transmission occasion, wherein the accumulation includes the one or more power correction indicators as accumulated as of a time of the uplink data channel transmission occasion.

In a twenty-eighth aspect, alone or in combination with one or more of the twenty-fifth aspect through the twenty-seventh aspect, wherein the means for applying the accumulation of the one or more power correction indicators includes: means for applying the accumulation of the one or more power correction indicators to the adjustment state of the transmit power at each uplink control transmission occasion, wherein the accumulation includes the one or more power correction indicators as accumulated as of a time of the uplink control transmission occasion.

In a twenty-ninth aspect, alone or in combination with one or more of the twenty-fifth aspect through the twenty-eighth aspect, wherein the one or more power correction indicators of the accumulation corresponds to one or more common power correction indicators included in one or more predetermined common TPC commands, and wherein the adjustment state corresponding to the uplink control channel and the uplink data channel includes an uplink control adjustment state and an uplink data adjustment state.

In a thirtieth aspect, alone or in combination with one or more of the twenty-fifth aspect through the twenty-ninth aspect, wherein the means for receiving the TPC command in the one or more downlink control messages includes: means for receiving the one or more predetermined common TPC commands in one or more predetermined common downlink control messages of the one or more downlink control messages, means for receiving one or more uplink data-specific TPC commands in one or more uplink data-specific downlink control messages of the one or more downlink control messages, and means for receiving one or more uplink control-specific TPC commands in one or more uplink control-specific downlink control messages of the one or more downlink control messages, wherein the means for applying the accumulation of one or more power correction indicators includes: means for applying the accumulation of one or more common power correction indicators to the uplink data adjustment state and the uplink control adjustment state, means for applying the accumulation of one or more data-specific power correction indicators in the one or more uplink data-specific TPC commands to the uplink data adjustment state, and means for applying the accumulation of one or more control-specific power correction indicators in the one or more uplink control-specific TPC commands to the uplink control adjustment state, and wherein the means for transmitting the uplink control channel and the uplink data channel includes: means for transmitting the uplink data channel to the uplink receive point according to the transmit power adjusted by the uplink data adjustment state, and means for transmitting the uplink control channel to the uplink receive point according to the transmit power adjusted by the uplink control adjustment state.

In a thirty-first aspect, alone or in combination with one or more of the twenty-fifth aspect through the thirtieth aspect, wherein one or more of: the uplink data adjustment state includes a plurality of uplink data adjustment states, and the uplink control adjustment state includes a plurality of uplink control adjustment states, and wherein the means for applying the accumulation of the one or more common power correction indicators includes one of: means for applying the accumulation of the one or more common power correction indicators to one or more of a first uplink data adjustment state of the plurality of uplink data adjustment states and a first control data adjustment state of the plurality of uplink data adjustment states; or means for applying the accumulation of the one or more common power correction indicators to one or more of the plurality of uplink data adjustment states and the plurality of uplink control adjustment states.

In a thirty-second aspect, alone or in combination with one or more of the twenty-fifth aspect through the thirty-first aspect, wherein the means for applying the accumulation of the one or more common power correction indicators to the one or more of the plurality of uplink data adjustment states and the plurality of uplink control adjustment states includes: means for applying the accumulation of the one or more common power correction indicators to the one or more of a corresponding one or more uplink data adjustment states of the plurality of uplink data adjustment states and a corresponding one or more uplink control adjustment states of the plurality of uplink control adjustment states.

In a thirty-third aspect, alone or in combination with one or more of the twenty-fifth aspect through the thirty-second aspect, wherein the one or more predetermined common TPC commands includes one or more of: the TPC command received in one or more random access messages; the TPC command received in a group common DCI message; the TPC command received in a fallback DCI message; or the TPC command received in a non-fallback DCI message.

In a thirty-fourth aspect, alone or in combination with one or more of the twenty-fifth aspect through the thirty-third aspect, wherein the one or more downlink control messages includes one or more of: random access procedure messages; and DCI messages.

In a thirty-fifth aspect, alone or in combination with one or more of the twenty-fifth aspect through the thirty-fourth aspect, further including: means for receiving, by the UE, a configuration indicator from the serving base station, wherein the configuration indicator indicates one of one or more component carriers or one or more bandwidth parts to perform the means for applying and the means for transmitting.

In a thirty-sixth aspect, alone or in combination with one or more of the twenty-fifth aspect through the thirty-fifth aspect, further including: means for signaling, by the UE, a capability report to the serving base station, wherein the capability report indicates the UE is capable to perform the means for applying and the means for transmitting, wherein the configuration indicator is received after the signaling the capability report.

A thirty-seventh aspect includes a non-transitory computer-readable medium having program code recorded thereon, the program code includes program code executable by a computer for causing the computer to receive, by the UE, a TPC command in one or more downlink control messages from a serving base station, wherein the TPC command includes a power correction indicator; program code executable by the computer for causing the computer to apply, by the UE, an accumulation of one or more power correction indicators received in the one or more downlink control messages to an adjustment state associated with a transmit power of an of uplink control channel or an uplink data channel; and program code executable by the computer for causing the computer to transmit, by the UE to an uplink receive point, the uplink control channel or the uplink data channel according to the transmit power adjusted by the accumulation of the one or more power correction indicators applied to the adjustment state, wherein the uplink receive point is different from the serving base station.

In a thirty-eighth aspect, alone or in combination with the thirty-seventh aspect, wherein the one or more power correction indicators of the accumulation corresponds to each power correction indicator received in the one or more downlink control messages, and wherein the adjustment state is shared by the uplink control channel and the uplink data channel.

In a thirty-ninth aspect, alone or in combination with a thirty-eighth aspect, wherein the program code executable by the computer for causing the computer to apply the accumulation of the one or more power correction indicators includes program code executable by the computer for causing the computer: to apply the accumulation of the one or more power correction indicators to the adjustment state of the transmit power at each uplink data channel transmission occasion, wherein the accumulation includes the one or more power correction indicators as accumulated as of a time of the uplink data channel transmission occasion.

In a fortieth aspect, alone or in combination with one or more of the thirty-seventh aspect through the thirty-ninth aspect, wherein the program code executable by the computer for causing the computer to apply the accumulation of the one or more power correction indicators includes program code executable by the computer for causing the computer: to apply the accumulation of the one or more power correction indicators to the adjustment state of the transmit power at each uplink control transmission occasion, wherein the accumulation includes the one or more power correction indicators as accumulated as of a time of the uplink control transmission occasion.

In a forty-first aspect, alone or in combination with one or more of the thirty-seventh aspect through the fortieth aspect, wherein the one or more power correction indicators of the accumulation corresponds to one or more common power correction indicators included in one or more predetermined common TPC commands, and wherein the adjustment state corresponding to the uplink control channel and the uplink data channel includes an uplink control adjustment state and an uplink data adjustment state.

In a forty-second aspect, alone or in combination with one or more of the thirty-seventh aspect through the forty-first aspect, wherein the program code executable by the computer for causing the computer to receive the TPC command in the one or more downlink control messages includes program code executable by the computer for causing the computer to: receive the one or more predetermined common TPC commands in one or more predetermined common downlink control messages of the one or more downlink control messages, receive one or more uplink data-specific TPC commands in one or more uplink data-specific downlink control messages of the one or more downlink control messages, and receive one or more uplink control-specific TPC commands in one or more uplink control-specific downlink control messages of the one or more downlink control messages, wherein the program code executable by the computer for causing the computer to apply the accumulation of one or more power correction indicators includes program code executable by the computer for causing the computer to: apply the accumulation of one or more common power correction indicators to the uplink data adjustment state and the uplink control adjustment state, apply the accumulation of one or more data-specific power correction indicators in the one or more uplink data-specific TPC commands to the uplink data adjustment state, and apply the accumulation of one or more control-specific power correction indicators in the one or more uplink control-specific TPC commands to the uplink control adjustment state, and wherein the program code executable by the computer for causing the computer to transmit the uplink control channel and the uplink data channel includes program code executable by the computer for causing the computer to: transmit the uplink data channel to the uplink receive point according to the transmit power adjusted by the uplink data adjustment state, and transmit the uplink control channel to the uplink receive point according to the transmit power adjusted by the uplink control adjustment state.

In a forty-third aspect, alone or in combination with one or more of the thirty-seventh aspect through the forty-second aspect, wherein one or more of: the uplink data adjustment state includes a plurality of uplink data adjustment states, and the uplink control adjustment state includes a plurality of uplink control adjustment states, and wherein the program code executable by the computer for causing the computer to apply the accumulation of the one or more common power correction indicators includes program code executable by the computer for causing the computer to one of: apply the accumulation of the one or more common power correction indicators to one or more of a first uplink data adjustment state of the plurality of uplink data adjustment states and a first control data adjustment state of the plurality of uplink data adjustment states; or apply the accumulation of the one or more common power correction indicators to one or more of the plurality of uplink data adjustment states and the plurality of uplink control adjustment states.

In a forty-fourth aspect, alone or in combination with one or more of the thirty-seventh aspect through the forty-third aspect, wherein the program code executable by the computer for causing the computer to apply the accumulation of the one or more common power correction indicators to the one or more of the plurality of uplink data adjustment states and the plurality of uplink control adjustment states includes program code executable by the computer for causing the computer: to apply the accumulation of the one or more common power correction indicators to the one or more of a corresponding one or more uplink data adjustment states of the plurality of uplink data adjustment states and a corresponding one or more uplink control adjustment states of the plurality of uplink control adjustment states.

In a forty-fifth aspect, alone or in combination with one or more of the thirty-seventh aspect through the forty-fourth aspect, wherein the one or more predetermined common TPC commands includes one or more of: the TPC command received in one or more random access messages; the TPC command received in a group common DCI message; the TPC command received in a fallback DCI message; or the TPC command received in a non-fallback DCI message.

In a forty-sixth aspect, alone or in combination with one or more of the thirty-seventh aspect through the forty-fifth aspect, wherein the one or more downlink control messages includes one or more of: random access procedure messages; and DCI messages.

In a forty-seventh aspect, alone or in combination with one or more of the thirty-seventh aspect through the forty-sixth aspect, further including program code executable by the computer for causing the computer: to receive, by the UE, a configuration indicator from the serving base station, wherein the configuration indicator indicates one of one or more component carriers or one or more bandwidth parts to perform the applying and the transmitting.

In a forty-eighth aspect, alone or in combination with one or more of the thirty-seventh aspect through the forty-seventh aspect, further including program code executable by the computer for causing the computer: to signal, by the UE, a capability report to the serving base station, wherein the capability report indicates the UE is capable to execute the program code executable by the computer for causing the computer to apply and to transmit, wherein the configuration indicator is received after the signaling the capability report.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
    receiving, by the UE, one or more predetermined common transmit power control (TPC) commands in one or more predetermined common downlink control messages from a serving base station, wherein the one or more predetermined common TPC commands includes one or more common power correction indicators;
    receiving, by the UE, one or more uplink data-specific TPC commands in one or more uplink data-specific downlink control messages from the serving base station, wherein the one or more uplink data-specific TPC commands includes one or more data-specific power correction indicators;
    receiving, by the UE, one or more uplink control-specific TPC commands in one or more uplink control-specific downlink control messages from the serving base station, wherein the one or more uplink control-specific TPC commands includes one or more uplink control-specific power correction indicators;
    applying, by the UE, an accumulation of the one or more common power correction indicators to an uplink data adjustment state and an uplink control adjustment state;
    applying, by the UE, the accumulation of the one or more data-specific power correction indicators to the uplink data adjustment state;
    applying, by the UE, the accumulation of the one or more uplink control-specific power correction indicators to the uplink control adjustment state;
    transmitting, by the UE to an uplink receive point while the UE maintains communication with the serving base station, the uplink data channel to the uplink receive point according to a transmit power adjusted by the uplink data adjustment state; and
    transmitting, by the UE to the uplink receive point while the UE maintains communication with the serving base station, the uplink control channel to the uplink receive point according to the transmit power adjusted by the uplink control adjustment state, the uplink control channel or the uplink data channel being directed to the serving base station, wherein the uplink receive point is different from the serving base station.

2. The method of claim 1, wherein the applying the accumulation of the one or more data-specific power correction indicators includes:
    applying the accumulation of the one or more data-specific power correction indicators to an adjustment state of the transmit power at each uplink data channel transmission occasion, wherein the accumulation includes the one or more data-specific power correction indicators as accumulated as of a time of the uplink data channel transmission occasion.

3. The method of claim 1, wherein the applying the accumulation of the one or more control-specific power correction indicators includes:
applying the accumulation of the one or more control-specific power correction indicators to an adjustment state of the transmit power at each uplink control transmission occasion, wherein the accumulation includes the one or more control-specific power correction indicators as accumulated as of a time of the uplink control transmission occasion.

4. The method of claim 1,
wherein one or more of:
the uplink data adjustment state includes a plurality of uplink data adjustment states, and
the uplink control adjustment state includes a plurality of uplink control adjustment states, and
wherein the applying the accumulation of the one or more common power correction indicators includes one of:
applying the accumulation of the one or more common power correction indicators to one or more of a first uplink data adjustment state of the plurality of uplink data adjustment states and a first control data adjustment state of the plurality of uplink data adjustment states; or
applying the accumulation of the one or more common power correction indicators to one or more of the plurality of uplink data adjustment states and the plurality of uplink control adjustment states.

5. The method of claim 4, wherein the applying the accumulation of the one or more common power correction indicators to the one or more of the plurality of uplink data adjustment states and the plurality of uplink control adjustment states includes:
applying the accumulation of the one or more common power correction indicators to the one or more of a corresponding one or more uplink data adjustment states of the plurality of uplink data adjustment states and a corresponding one or more uplink control adjustment states of the plurality of uplink control adjustment states.

6. The method of claim 1, wherein the one or more predetermined common TPC commands includes one or more of:
the TPC command received in one or more random access messages;
the TPC command received in a group common downlink control information (DCI) message;
the TPC command received in a fallback DCI message; or
the TPC command received in a non-fallback DCI message.

7. The method of claim 1, wherein the one or more predetermined common downlink control messages, the one or more uplink data-specific downlink control messages, and the one or more uplink control-specific downlink control messages includes one or more of:
random access procedure messages; and
downlink control information (DCI) messages.

8. The method of claim 1, further including:
receiving, by the UE, a configuration indicator from the serving base station, wherein the configuration indicator indicates one of one or more component carriers or one or more bandwidth parts to perform the applying and the transmitting.

9. The method of claim 8, further including:
signaling, by the UE, a capability report to the serving base station, wherein the capability report indicates the UE is capable to perform the applying and the transmitting, wherein the configuration indicator is received after the signaling the capability report.

10. A user equipment (UE) configured for wireless communication, the UE comprising:
at least one processor; and
a memory coupled to the at least one processor,
wherein the at least one processor is configured:
receive, by the UE, one or more predetermined common transmit power control (TPC) commands in one or more predetermined common downlink control messages from a serving base station, wherein the one or more predetermined common TPC commands includes one or more common power correction indicators;
receive, by the UE, one or more uplink data-specific TPC commands in one or more uplink data-specific downlink control messages from the serving base station, wherein the one or more uplink data-specific TPC commands includes one or more data-specific power correction indicators;
receive, by the UE, one or more uplink control-specific TPC commands in one or more uplink control-specific downlink control messages from the serving base station, wherein the one or more uplink control-specific TPC commands includes one or more uplink control-specific power correction indicators;
apply, by the UE, an accumulation of the one or more common power correction indicators to an uplink data adjustment state and an uplink control adjustment state;
apply, by the UE, the accumulation of the one or more data-specific power correction indicators to the uplink data adjustment state;
apply, by the UE, the accumulation of the one or more uplink control-specific power correction indicators to the uplink control adjustment state;
to transmit, by the UE to an uplink receive point while the UE also maintains communication with the serving base station, transmitting, by the UE to an uplink receive point while the UE maintains communication with the serving base station, the uplink data channel to the uplink receive point according to a transmit power adjusted by the uplink data adjustment state; and
transmitting, by the UE to the uplink receive point while the UE maintains communication with the serving base station, the uplink control channel to the uplink receive point according to the transmit power adjusted by the uplink control adjustment state, the uplink control channel or the uplink data channel being directed to the serving base station, wherein the uplink receive point is different from the serving base station.

11. The UE of claim 10, wherein a configuration of the at least one processor to apply the accumulation of the one or more data-specific power correction indicators includes configuration of the at least one processor:
to apply the accumulation of the one or more data-specific power correction indicators to an adjustment state of the transmit power at each uplink data channel transmission occasion, wherein the accumulation includes the one or more data-specific power correction indicators as accumulated as of a time of the uplink data channel transmission occasion.

12. The UE of claim 10, wherein a configuration of the at least one processor to apply the accumulation of the one or more control-specific power correction indicators includes configuration of the at least one processor:

to apply the accumulation of the one or more control-specific power correction indicators to an adjustment state of the transmit power at each uplink control transmission occasion, wherein the accumulation includes the one or more control-specific power correction indicators as accumulated as of a time of the uplink control transmission occasion.

13. The UE of claim 10,
wherein one or more of:
the uplink data adjustment state includes a plurality of uplink data adjustment states, and
the uplink control adjustment state includes a plurality of uplink control adjustment states, and
wherein the configuration of the at least one processor to apply the accumulation of the one or more common power correction indicators includes configuration of the at least one processor to one of:
apply the accumulation of the one or more common power correction indicators to one or more of a first uplink data adjustment state of the plurality of uplink data adjustment states and a first control data adjustment state of the plurality of uplink data adjustment states; or
apply the accumulation of the one or more common power correction indicators to one or more of the plurality of uplink data adjustment states and the plurality of uplink control adjustment states.

14. The UE of claim 13, wherein the configuration of the at least one processor to apply the accumulation of the one or more common power correction indicators to the one or more of the plurality of uplink data adjustment states and the plurality of uplink control adjustment states includes configuration of the at least one processor:
to apply the accumulation of the one or more common power correction indicators to the one or more of a corresponding one or more uplink data adjustment states of the plurality of uplink data adjustment states and a corresponding one or more uplink control adjustment states of the plurality of uplink control adjustment states.

15. The UE of claim 10, wherein the one or more predetermined common TPC commands includes one or more of:
the TPC command received in one or more random access messages;
the TPC command received in a group common downlink control information (DCI) message;
the TPC command received in a fallback DCI message; or
the TPC command received in a non-fallback DCI message.

16. The UE of claim 10, wherein the one or more predetermined common downlink control messages, the one or more uplink data-specific downlink control messages, and the one or more uplink control-specific downlink control messages includes one or more of:
random access procedure messages; and
downlink control information (DCI) messages.

17. The UE of claim 10, further including configuration of the at least one processor:
to receive, by the UE, a configuration indicator from the serving base station, wherein the configuration indicator indicates one of one or more component carriers or one or more bandwidth parts to execute a configuration of the at least one processor to apply and the configuration of the at least one processor to transmit.

18. The UE of claim 17, further including configuration of the at least one processor:

to signal, by the UE, a capability report to the serving base station, wherein the capability report indicates the UE is capable to execute the configuration of the at least one processor to apply and the configuration of the at least one processor to transmit, wherein the configuration indicator is received after the signaling the capability report.

19. A user equipment (UE) configured for wireless communication, comprising:
means for receiving, by the UE, one or more predetermined common transmit power control (TPC) commands in one or more predetermined common downlink control messages from a serving base station, wherein the one or more predetermined common TPC commands includes one or more common power correction indicators;
means for receiving, by the UE, one or more uplink data-specific TPC commands in one or more uplink data-specific downlink control messages from the serving base station, wherein the one or more uplink data-specific TPC commands includes one or more data-specific power correction indicators;
means for receiving, by the UE, one or more uplink control-specific TPC commands in one or more uplink control-specific downlink control messages from the serving base station, wherein the one or more uplink control-specific TPC commands includes one or more uplink control-specific power correction indicators;
means for applying, by the UE, an accumulation of the one or more common power correction indicators to an uplink data adjustment state and an uplink control adjustment state;
means for applying, by the UE, the accumulation of the one or more data-specific power correction indicators to the uplink data adjustment state;
means for applying, by the UE, the accumulation of the one or more uplink control-specific power correction indicators to the uplink control adjustment state;
means for transmitting, by the UE to an uplink receive point while the UE maintains communication with the serving base station, the uplink data channel to the uplink receive point according to a transmit power adjusted by the uplink data adjustment state; and
means for transmitting, by the UE to the uplink receive point while the UE maintains communication with the serving base station, the uplink control channel to the uplink receive point according to the transmit power adjusted by the uplink control adjustment state, the uplink control channel or the uplink data channel according to the transmit power adjusted by the accumulation of the one or more power correction indicators applied to the adjustment state, the uplink control channel or the uplink data channel being directed to the serving base station, wherein the uplink receive point is different from the serving base station.

20. A non-transitory computer-readable medium having program code recorded thereon, the program code comprising:
program code executable by a computer for causing the computer to receive, by the UE, one or more predetermined common transmit power control (TPC) commands in one or more predetermined common downlink control messages from a serving base station, wherein the one or more predetermined common TPC commands includes one or more common power correction indicators;

program code executable by the computer for causing the computer to receive, by the UE, one or more uplink data-specific TPC commands in one or more uplink data-specific downlink control messages from the serving base station, wherein the one or more uplink data-specific TPC commands includes one or more data-specific power correction indicators;

program code executable by the computer for causing the computer to receive, by the UE, one or more uplink control-specific TPC commands in one or more uplink control-specific downlink control messages from the serving base station, wherein the one or more uplink control-specific TPC commands includes one or more uplink control-specific power correction indicators;

program code executable by the computer for causing the computer to apply, by the UE, an accumulation of the one or more common power correction indicators to an uplink data adjustment state and an uplink control adjustment state;

program code executable by the computer for causing the computer to apply, by the UE, the accumulation of the one or more data-specific power correction indicators to the uplink data adjustment state;

program code executable by the computer for causing the computer to apply, by the UE, the accumulation of the one or more uplink control-specific power correction indicators to the uplink control adjustment state;

program code executable by the computer for causing the computer to transmit, by the UE to an uplink receive point while the UE maintains communication with the serving base station, the uplink data channel to the uplink receive point according to a transmit power adjusted by the uplink data adjustment state; and program code executable by the computer for causing the computer to transmit, by the UE to the uplink receive point while the UE maintains communication with the serving base station, the uplink control channel to the uplink receive point according to the transmit power adjusted by the uplink control adjustment state, the uplink control channel or the uplink data channel being directed to the serving base station, wherein the uplink receive point is different from the serving base station.

* * * * *